Dec. 4, 1962 W. M. CATRON ET AL 3,066,458
METHOD OF MAKING LENSES
Filed Oct. 1, 1959 3 Sheets-Sheet 1

INVENTORS.
WILLIAM M. CATRON.
TED F. KENYON.
BY
Lockwood, Woodard, Smith & Weikart.
ATTORNEYS.

Dec. 4, 1962 W. M. CATRON ET AL 3,066,458
METHOD OF MAKING LENSES
Filed Oct. 1, 1959 3 Sheets-Sheet 2
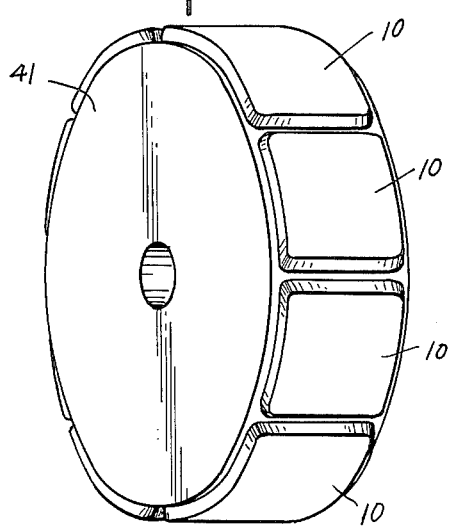
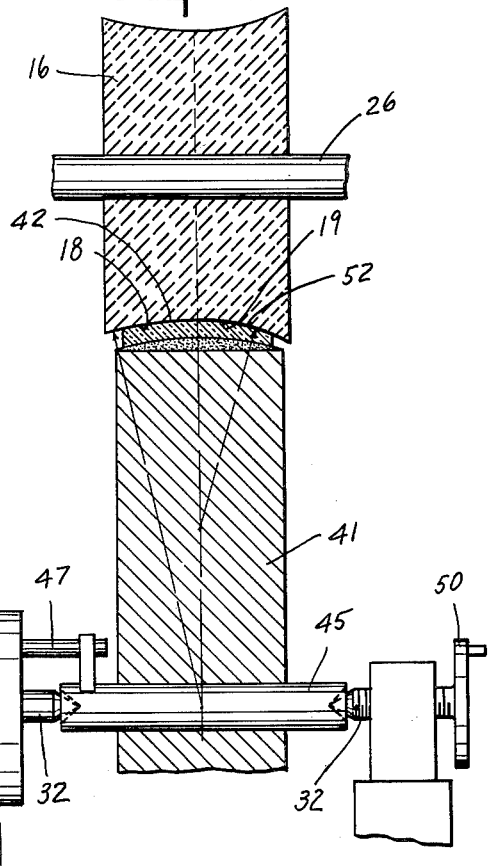
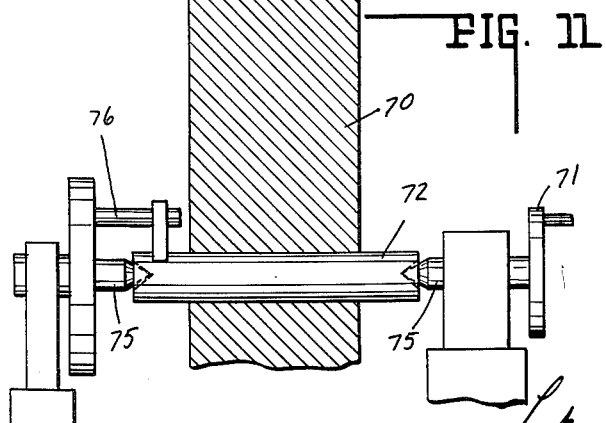
INVENTORS.
WILLIAM M. CATRON.
TED F. KENYON.
BY
Lockwood, Woodard, Smith & Weikart.
ATTORNEYS.

Dec. 4, 1962 W. M. CATRON ET AL 3,066,458
METHOD OF MAKING LENSES
Filed Oct. 1, 1959 3 Sheets-Sheet 3
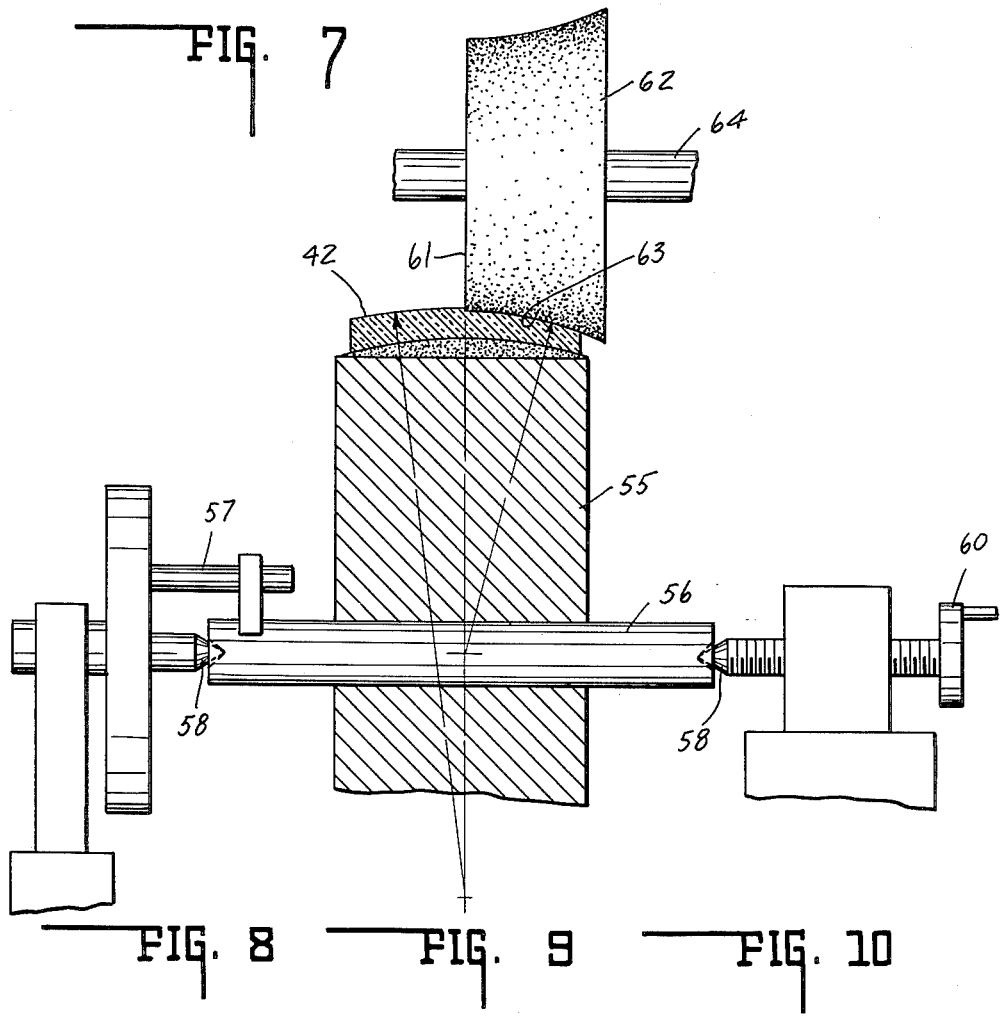
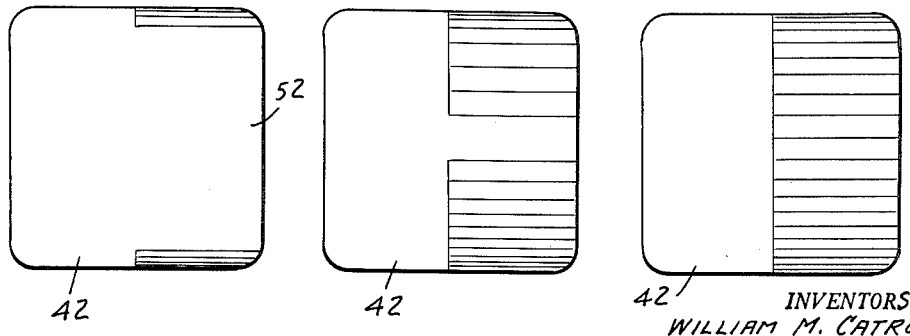
INVENTORS.
WILLIAM M. CATRON,
TED F. KENYON.
BY
Lockwood, Woodard, Smith & Weikart.
ATTORNEYS.

United States Patent Office 3,066,458
Patented Dec. 4, 1962

3,066,458
METHOD OF MAKING LENSES
William M. Catron and Ted F. Kenyon, Indianapolis, Ind., assignors to Continental Optical Company, Inc., Indianapolis, Ind., a corporation
Filed Oct. 1, 1959, Ser. No. 843,765
5 Claims. (Cl. 51—284)

This invention relates to an improved method or process of making a one piece bifocal or multifocal lens blank which may be finally processed into a prescription lens, and particularly such a one piece bifocal or multifocal lens or lens blank having fields of different power joined by a straight line, reference being had to the bifocal lens blank and method of making the same disclosed in Letters Patent 2,847,804, granted August 19, 1958 on an application of Tracy H. Calkins and Thomas S. Hood.

One procedure for forming such lens blanks includes the mounting of a plurality of unfinished molded blanks of optical glass along the circumferential periphery of a blocking wheel with the convex surface of each unfinished blank facing radially outwardly. The blocking wheel, which has a predetermined radius, is then rotated about its axis and the unfinished lens blanks are ground to a spherical surface by a grinding stone wheel also rotating about its axis. The outer periphery of the grinding stone wheel has a concave shape having a radius of cross curvature approximately equal to the radius of the blocking wheel (and ground lens blanks mounted thereon) which makes possible the formation of a spherical surface on each lens blank. This spherical surface constitutes the base curve of the bifocal lens and provides the basic shape of the portion of the lens used for distance vision.

The lens blanks are then removed from the blocking wheel and are mounted in similar fashion on a second blocking wheel having a shorter radius than the first blocking wheel. One half of the outwardly facing lens surface is then further ground to a spherical surface of shorter radius by the use of a second grinding wheel substantially in the manner above described with respect to the forming of the base curve of the lens with the exception that the second grinding wheel contacts only the near vision portion of the lens. The further ground sperical surface on one half of the lens surface constitutes the add curve and provides the basic shape of the portion of the lens used for near vision. Such a method of grinding bifocal lens blanks is described in detail, inter alia, in the above mentioned patent.

A problem of disadvantageous feature of the above process results from the fact that the second grinding wheel used to form the add curve wears unevenly during the grinding of the add curve surface. The uneven wear results from the fact that more material must be removed from the corners of the lens blank than from the portion of the surface adjacent the center of the lens blank.

A number of problems result from the uneven wearing of the add curve grinding wheel. First, the wheel must be frequently retrued usually by means of a pivotally mounted diamond pointed arm. Second, the uneven wear of the grinding wheel results in an add curve which is not a true spherical curve. Third, the large amount of material which must be removed from the corners of the lens blank results in unduly long grinding time. Fourth, polishing of the add curve surface does not always remove all of the pits and scratches resulting from the grinding operation, it being understood that the polishing tool is formed with a concave spherical surface. Also the finally polished add curve surface will not be a true sphere resulting in undesirable cylindrical optical effects on the finished lens.

For the above reasons it is a primary object of the present invention to provide a method of making lens blanks which eliminates uneven wear of the add curve grinding wheel and the problems resulting from such uneven wear.

A further and perhaps most important object of the present invention is to provide a method of making lens blanks which results in more accurately formed lens blanks.

Still further related objects and advantages will become apparent as the description proceeds.

The full nature of the invention will be understood from the accompanying drawings and the following description and claims:

FIG. 5 is a perspective view of a blocking wheel upon which the unfinished blanks are mounted for grinding by the grinding wheel shown in FIGS. 3 and 4.

FIG. 6 is an enlarged central vertical section through a portion of the blocking wheel of FIG. 5 and additionally shows means for rotating the wheel and also the grinding wheel of FIGS. 3 and 4 in position for rough grinding lens blanks upon the blocking wheel.

FIG. 7 is a central vertical section through a portion of a further blocking wheel of smaller diameter than the above mentioned blocking wheel and additionally shows means for rotating the wheel and also a further grinding wheel in position for finish grinding the near vision field or add curve of lens blanks mounted upon a wheel.

FIGS. 8, 9 and 10 are views showing the various stages of grinding of the near vision field or add curve of the lens blanks upon the apparatus illustrated in FIG. 7.

FIG. 11 is a central vertical section through a portion of a blocking wheel and additionally shows means for rotating the wheel and also a further grinding wheel in position for finish grinding the distance vision field or base curve of lens blanks mounted upon the wheel.

Figure 1:
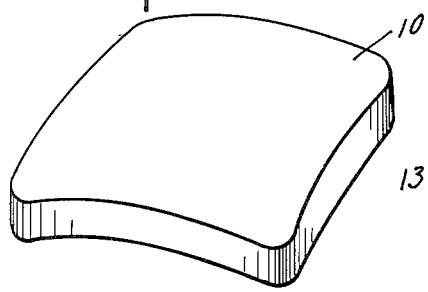
FIG. 1 is a perspective view of an unfinished molded lens blank.
Figure 2:
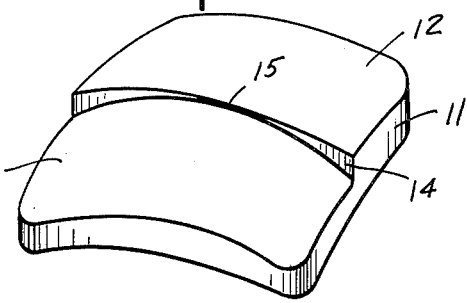
FIG. 2 is a perspective view of a bifocal finished blank following the processing thereof.

The method comprising this invention is illustrated serially by means of the accompanying drawings wherein FIG. 1 shows the unfinished blank 10 of optical glass which is processed, by grinding and polishing the convex surface thereof, into a finished bifocal blank 11, as shown in FIG. 2, having a distance vision field 12 and a near vision or reading field 13 separated by a straight line of demarcation extending transversely from side to side as indicated by the shoulder 14. The two surfaces approach merger centrally of the blank as indicated at 15, the shoulders gradually increasing in depth from the point of near merger to the lateral edges of the blank. For aesthetic and other reasons, it is desirable that there not be complete merger at the point 15 and therefore such lenses are usually formed with from .002 to .010 inch thickness of shoulder at the center point of the lens.

Figure 3:
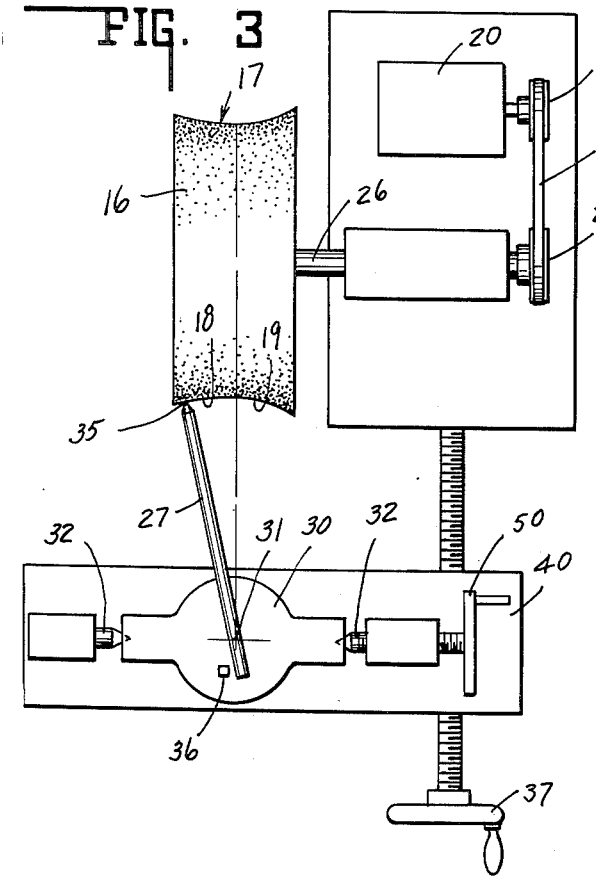
FIG. 3 is a plan view of reduced dimensions showing apparatus for forming the grinding surface upon a grinding stone wheel.

In producing the finished blank of FIG. 2, a grinding wheel 16 must first be formed at its outward peripheral surface 17 (FIG. 3) into a concave shape in which one portion 18 of the surface 17 has a radius of cross curvature approximating the desired spherical radius of the distance field or base curve of the lens and in which the other portion 19 of the surface 17 has a shorter radius of cross curvature approximating the desired spherical radius of the near field of vision or add curve, the two portions merging tangentially at the midpoint of the concave surface 17 of the grinding wheel. It is extremely important that the two portions 18 and 19 meet at exactly the center or midpoint of the grinding wheel, and this result is accomplished by the use of the apparatus illustrated in FIG. 3.

Figure 4:
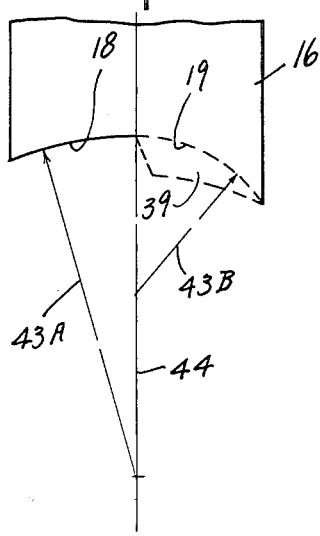
FIG. 4 is an enlarged view of a portion of the grinding stone wheel of FIG. 3.

There is provided a drive means 20, such as an electric motor, for rotating the grinding wheel 16 about its axis, the driving being accomplished through grooved pulleys 21 and 22, drive belt 25, and spindle 26. A diamond pointed arm 27 is pivotally mounted upon the member 30 for swinging about the point 31. The point 31 is located by centering means 32—32 in the same plane, as viewed in the drawing, as the axis of the grinding wheel 16. The diamond pointed arm 27 is adjusted to the position as illustrated in the drawings in which the length of the arm between point 31 and the diamond point 35 is approximately equal to the desired spherical radius of the distance field or base curve of the lens. A stop pin 36 is mounted upon the member 30 in such a position as to stop the swinging of the arm 27 when it is contacting the precise apex of the curve formed by the diamond pointed arm. By swinging the diamond point backwardly and forwardly across the face of the grinding stone and gradually moving the center 31 toward the stone by operation of crank 37, the desired radius of the distance field may be formed on the portion 18 of the surface of the stone. FIG. 4 illustrates the appearance of the grinding stone after the forming of the distance vision radius upon the stone, the dotted line portion 39 being left after the forming of surface 18. It should be understood that FIG. 4 exaggerates the amount of grinding necessary to form the desired shape in order to clearly illustrate the process.

The diamond pointed arm 27 is then adjusted upon the member 30 so that the distance between the point 31 and the diamond end 35 of the arm is approximately equal to the desired spherical radius of the near vision field or add curve. The pivotal point 31 of the arm 27 is then moved toward the grinding stone 16 by rotating the crank 37 to move the member 40 a sufficient distance that the diamond point 35 contacts the portion 39 (FIG. 4) of the stone. The portion 39 is then removed by a similar operation to that above described to form on the stone the surface portion 19 which merges tangentially with the portion 18 whereby the two circular arcs merge tangentially.

In order to form the portion 19 to its correct shape without affecting the shape of the already formed portion 18, the diamond pointed arm is started from the outside and swung to the center and returned to the starting position without further motion of center 31 toward the stone 16. The center 31 is advanced slightly and the process repeated. The operator can always tell whether further cutting is necessary by watching the shoulder (or inward edge of portion 39) left by the forming of the portion 18. When this shoulder disappears, the portion 18 and 19 merge tangentially. Referring to FIG. 4, the two desired radii of cross curvature are indicated by 43A and 43B. It can be seen that the centers of these radii are on the same line 44 which represents a plane through the center of the grinding wheel 16. Thus, the two portions 18 and 19 of the peripheral surface of the grinding wheel will merge tangentially at the line 44.

Referring now to FIG. 5, the unfinished lens blanks 10 are blocked or mounted about the circumferential periphery of a blocking wheel 41, the conventional means of attaching the lens to a blocking wheel being by the use of melted pitch. The radius of the wheel 41 is approximately equal to the desired spherical radius of the distance field or base curve so that after grinding has been completed by means of the grinding wheel 16, the shape of the distance field surface 42 of each lens blank will be spherical. In other words, the blocking wheel 41 has a predetermined radius which may be added to the final thickness of the base curve portion of the lens to give the desired spherical radius of the distance field.

The blocking wheel 41 is mounted upon a spindle 45 and the spindle 45 is then mounted between centers 32 by operation of crank 50 for rotation by driving means 47 whereby the blocking wheel 41 may be rotated about its axis. The blocking wheel is accurately positioned on the centers 32 in such a manner that the exact midpoint of the grinding wheel surface is in alignment with the mid-point of the blocking wheel 41 and the mid-points of the outer surfaces of the lens blanks mounted thereon. The grinding wheel 16 and blocking wheel 41 are rotated and brought together as illustrated in FIG. 6 and the lens blanks are ground until each of the blanks has a spherical distance field or base curve 42 formed thereon. It should be noted that the surface 52 formed upon the near field portions of the lens blanks will not be spherical in shape but will have a cross radius which is equal to the desired spherical radius of the near field.

The lens blanks are then deblocked and reblocked upon a blocking wheel 55 (FIG. 7) having a radius approximately equal to the desired spherical radius of the near field. That is, the blocking wheel 55 has a predetermined radius which may be added to the final thickness of the add curve portion of the lens to give the desired spherical radius of the near field. By operation of crank 60, the spindle 56 of the blocking wheel 55 is positioned on centers 58 for rotation by rotating means 57, about the axis of the blocking wheel. The centers of the blocking wheel 55 and the lens blanks mounted thereon are located in such a manner that the mid-points of the lenses are aligned with the edge 61 of the finish grinding wheel 62. The grinding wheel 62 has a concave peripheral surface 63 which has a radius of cross curvature equal to the desired spherical radius of the near vision field or add curve. The grinding wheel 62 is rotated about its axis and on spindle 64; the blocking wheel 55 is rotated about its axis, and the grinding wheel and blocking wheel are brought together as illustrated in FIG. 7 for grinding the near field of the lens. The grinding is continued until the lens blank is formed with a finish ground spherical surface upon the near vision field.

FIGS. 8, 9 and 10 illustrate an important advantage of the present invention. FIG. 8 shows the lens just after grinding of the near vision field has been begun. FIG. 9 shows the lens when grinding is nearly completed. FIG. 10 shows the completed spherical surface formed upon the near vision side of a lens blank. It can be seen from these FIGURES (8, 9, and 10) that grinding does not proceed from the corners of the lens but rather proceeds from both sides of the lens to the center. This is because the lens blanks were initially ground to provide a near vision field having the proper cross curvature instead of the same curvature as that of the distance field. As a result, the entire curve of the wheel 62 engages the lens from the time that grinding begins until the entire near field is completely ground.

Thus, the wear upon the finish grinding wheel 62 will be uniform across its surface and frequent retruing of the grinding wheel will not be necessary because the radius of cross curvature will remain approximately constant. Also, because of the fact that the grinding wheel 62 maintains its correct radius of cross curvature, the lens blanks are ground to a more nearly perfect spherical surface upon their near fields which is in fact a finish ground surface and does not require further grinding.

The lens blanks are next deblocked and reblocked upon a blocking wheel 70 (FIG. 11) having a radius approximately equal to the desired spherical radius of the distance vision field. By operation of crank 71, the spindle 72 of the blocking wheel is positioned on centers 75 for rotation by driving means 76 about the axis of the blocking wheel. A finish grinding wheel 77 having a concave peripheral surface 80 with radius of cross curvature equal to the desired spherical radius of the distance vision field is used to finish grind the distance field 42 of each blank to a spherical shape.

Both the grinding wheel and blocking wheel with lens blanks thereon are rotated and brought together to the position illustrated in FIG. 11 until the desired finish ground spherical surface is formed on the distance vision field of each lens blank. Final polishing of the thus ground lens blanks may be accomplished in conventional manner at any time after finish grinding of the respective near and distance vision fields.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of making one piece multifocal lens blanks having distance and near fields of vision separated by straight line shoulders which comprises blocking a plurality of unfinished blanks about the peripheral surface of a blocking wheel having a radius approximating the desired radius of the distance fields of vision, applying a grinding wheel to said blanks, said grinding wheel having a peripheral surface formed in a concave shape to provide a first toric surface having a radius of cross curvature approximating the desired spherical radius of the distance fields of vision and another toric surface having a radius of cross curvature approximating the desired spherical radius of the near fields of vision, the two toric surfaces merging centrally of the surface of the griding wheel, rotating said wheels until said distance fields are formed to approximately a spherical surface and said near fields are formed to a toric surface, deblocking said blanks and blocking them about the periphery of a second blocking wheel having a radius approximating the desired radius of said near fields of vision, applying to the near fields of said blanks a second grinding wheel having a concave surface with a cross curvature equal to the desired radius of said near fields of vision to engage substantially the entire curve of the concave surface of said second wheel with said near fields, simultaneously rotating said second wheels and grinding each lens blank in succession until said near fields of said blanks are formed to spherical surfaces, deblocking said blanks and reblocking them about the periphery of a third blocking wheel having a radius approximating the desired radius of the distance field, applying to the distance field portions of said blanks a third grinding wheel with a radius of cross curvature corresponding to the radius of said distance field of vision, and simultaneously rotating said third wheels and grinding each lens blank in succession until the distance field of each blank is finish ground to a spherical surface.

2. The method as claimed in claim 1 wherein said second grinding wheel has a concave peripheral surface with a cross curvature equal to the desired radius of said near fields of vision.

3. The method as claimed in claim 1 wherein said second grinding wheels are rotated simultaneously about parallel axes to grind said near fields.

4. The method as claimed in claim 1 wherein the toric surfaces of said first mentioned grinding wheel merge tangentially at the mid-point of the peripheral surface thereof.

5. The method as claimed in claim 1 wherein the midpoints of said first mentioned grinding wheel, said first mentioned blocking wheel, and said blanks mounted on said blocking wheel are in alignment with one another.

References Cited in the file of this patent

UNITED STATES PATENTS

| | | |
|---|---|---|
| Re. 14,822 | Conner | Mar. 23, 1920 |
| 2,847,804 | Calkins et al. | Aug. 19, 1958 |